United States Patent
Bensch et al.

(10) Patent No.: US 11,292,445 B2
(45) Date of Patent: Apr. 5, 2022

(54) METHOD FOR OPERATING AN ELECTRO-PNEUMATIC PARKING BRAKE FACILITY OF A VEHICLE-TRAILER COMBINATION

(71) Applicant: WABCO GmbH, Hannover (DE)

(72) Inventors: Uwe Bensch, Hannover (DE); Axel Gau, Bad Nenndorf (DE); Alexander Wendlandt, Hannover (DE); Torsten Franke, Burgdorf (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 72 days.

(21) Appl. No.: 16/625,806

(22) PCT Filed: Apr. 27, 2018

(86) PCT No.: PCT/EP2018/060841
§ 371 (c)(1),
(2) Date: Dec. 23, 2019

(87) PCT Pub. No.: WO2019/001801
PCT Pub. Date: Jan. 3, 2019

(65) Prior Publication Data
US 2021/0155216 A1    May 27, 2021

(30) Foreign Application Priority Data
Jun. 26, 2017 (DE) .......................... 102017006006.1

(51) Int. Cl.
*B60T 13/68* (2006.01)
*B60T 7/20* (2006.01)
(Continued)

(52) U.S. Cl.
CPC .............. *B60T 13/683* (2013.01); *B60T 7/20* (2013.01); *B60T 8/1708* (2013.01); *B60T 13/662* (2013.01); *B60T 13/74* (2013.01); *B60T 2201/10* (2013.01)

(58) Field of Classification Search
CPC . B60T 13/683; B60T 7/20; B60T 7/12; B60T 13/66; B60T 13/662; B60T 13/74;
(Continued)

(56) References Cited

U.S. PATENT DOCUMENTS

| 8,651,588 | B2 | 2/2014 | Bensch et al. |
| 8,795,136 | B2 | 8/2014 | Bensch et al. |

(Continued)

FOREIGN PATENT DOCUMENTS

| DE | 10336611 A1 | 3/2005 |
| DE | 10353056 A1 | 6/2005 |

(Continued)

OTHER PUBLICATIONS

Translation of European Patent document EP 2199162 obtained from website: https://worldwide.espacenet.com on May 18, 2021.*

(Continued)

*Primary Examiner* — Pamela Rodriguez
(74) *Attorney, Agent, or Firm* — Leydig, Voit & Mayer, Ltd.

(57) ABSTRACT

A method for operating an electropneumatic parking brake system of a vehicle combination, which includes a tractor vehicle and a trailer vehicle, includes activating, after a parking operation and braking of the vehicle combination, a trailer check function in a standstill state. The trailer check function enables a check as to whether, in the case of a decrease in the braking action of the trailer vehicle, the vehicle combination can be held in a stationary manner solely by way of the braking action of a parking brake of the (Continued)

tractor vehicle. The trailer check function is carried out automatically when a vehicle combination has been braked in a stationary manner independently by way of an automatic parking function.

13 Claims, 1 Drawing Sheet

(51) Int. Cl.
    *B60T 8/17*     (2006.01)
    *B60T 13/66*     (2006.01)
    *B60T 13/74*     (2006.01)

(58) Field of Classification Search
    CPC ...... B60T 13/263; B60T 17/22; B60T 8/1708; B60T 2201/10
    See application file for complete search history.

(56) References Cited

U.S. PATENT DOCUMENTS

| | | |
|---|---|---|
| 2005/0029859 A1 | 2/2005 | Bensch et al. |
| 2009/0099746 A1 | 4/2009 | Hilberer |
| 2010/0025141 A1* | 2/2010 | Bensch .................. B60T 8/327 180/271 |
| 2011/0168518 A1 | 7/2011 | Hilberer |
| 2012/0006634 A1 | 1/2012 | Bensch et al. |

FOREIGN PATENT DOCUMENTS

| | | |
|---|---|---|
| DE | 102004010743 A1 | 1/2006 |
| DE | 102005043607 A1 | 3/2007 |
| DE | 102005060225 A1 | 6/2007 |
| DE | 102007033694 B3 | 12/2008 |
| DE | 102008006264 B3 | 4/2009 |
| DE | 102008006265 A1 | 8/2009 |
| DE | 102008018470 A1 | 10/2009 |
| DE | 102007042316 B4 | 1/2010 |
| DE | 102008027732 B3 | 1/2010 |
| DE | 102008032709 A1 | 1/2010 |
| DE | 102008064077 A1 | 7/2010 |
| DE | 102014108681 B3 | 4/2015 |
| DE | 102016006527 A1 | 12/2016 |
| EP | 2199162 A1 | 6/2010 |
| EP | 1997700 B1 | 7/2011 |
| EP | 2379386 B1 | 12/2012 |
| EP | 2719594 A1 | 4/2014 |

OTHER PUBLICATIONS

Translation of German Patent document DE 102007033694 obtained from website: https://worldwide.espacenet.com on May 18, 2021.*

* cited by examiner

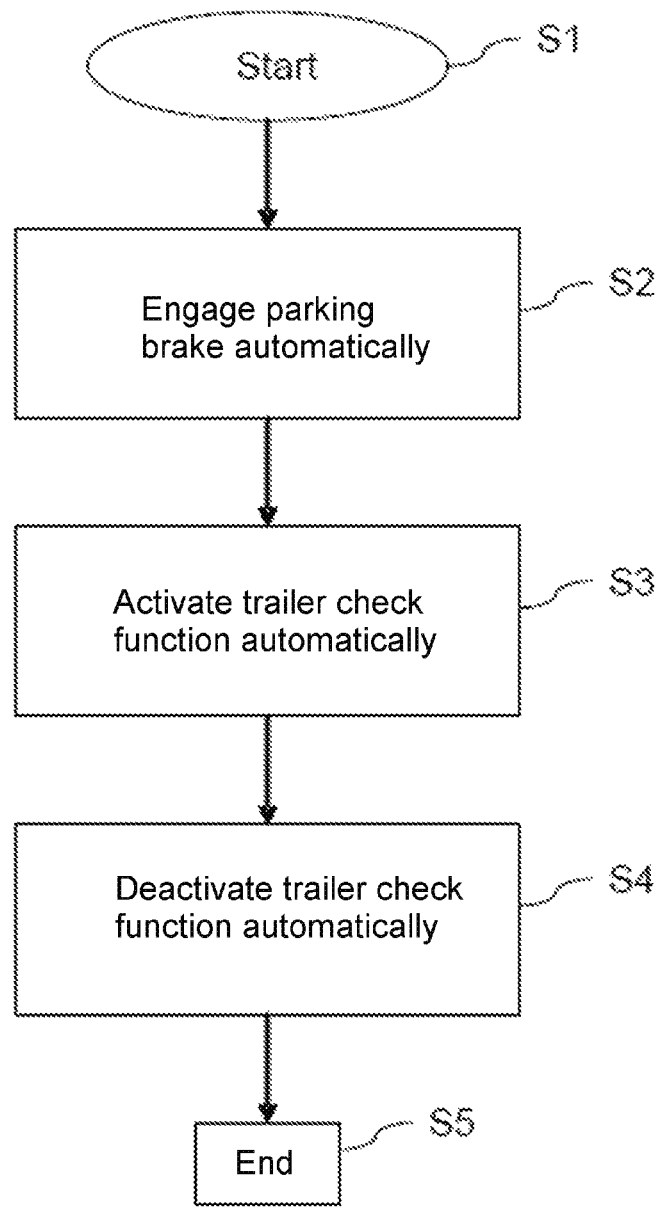

METHOD FOR OPERATING AN ELECTRO-PNEUMATIC PARKING BRAKE FACILITY OF A VEHICLE-TRAILER COMBINATION

CROSS REFERENCE TO RELATED APPLICATIONS

This application is a U.S. National Phase Application under 35 U.S.C. § 371 of International Application No. PCT/EP2018/060841, filed on Apr. 27, 2018, and claims benefit to German Patent Application No. DE 10 2017 006 006.1, filed on Jun. 26, 2017. The International Application was published in German on Jan. 3, 2019 as WO 2019/001801 under PCT Article 21(2).

FIELD

The invention relates to a method for operating an electropneumatic parking brake system of a vehicle combination which consists of a tractor vehicle and a trailer vehicle, in the case of which method, after a parking operation and the braking of the vehicle combination in the standstill state, a trailer check function is to be activated which enables a check as to whether, in the case of a decrease in the braking action of the trailer vehicle, the vehicle combination can be held in a stationary manner solely by way of the braking action of a parking brake of the tractor vehicle.

BACKGROUND

Electropneumatic parking brake systems of this type of vehicle combinations (often also called a park brake system or handbrake system) are known. The method of operation and control of a parking brake system of this type is described, for example, in DE 10 2005 060 225 A1.

Here, a trailer check function denotes a state of the parking brake system, in the case of which state, in the case of a parking brake which is applied per se, the brakes of a trailer vehicle which is connected to the tractor vehicle are released, in order to give the driver of the tractor vehicle a possibility of checking whether, in the case of a parked vehicle, the braking action of the parking brake of the tractor vehicle alone is sufficient, in order to prevent the entire vehicle combination from rolling away. A check of this type is required, in particular, in the case of trailers, in the case of which, for instance as a consequence of a gradual pressure loss, the brakes of the trailer might be released in the case of relatively long-term parking of the vehicle. It also has to be ensured in this case that the vehicle combination does not roll away, which accordingly has to be brought about by the parking brake of the tractor vehicle. The trailer check function is usually triggered manually by the driver immediately after parking of the vehicle combination and the actuation of the parking brake, by hand by way of actuation of an operating element such as a lever or switch, and is carried out by an electronic controller.

EP 2 379 386 B1 has disclosed an actuating device for a park brake system of a commercial vehicle, which actuating device has a manually actuable operating element for the actuation of the park brake. In the case of the previously engaged park brake, the actuating device can be set by the driver manually into a certain switching state, in which a trailer check function is provided. To this end, the driver can pivot a rocker switch out of a spring-loaded neutral position.

EP 1 997 700 B1 has disclosed a further actuating device for a park brake system of a commercial vehicle having an actuating element, in the case of which the actuating device has a trailer check position, it being possible for a trailer check function to be actuated in one of a plurality of available deflected positions of the actuating element. To this end, the driver can rotate a spring-loaded rotary switch in terms of its angular position. If the actuating element is situated in the trailer check position, an electronic controller of the park brake system brings about an actuation of a trailer check valve in the case of a vehicle at a standstill or a park brake which has already been activated, as a result of which a pneumatic control connector of a trailer control valve is loaded with a supply pressure. On the basis of an inverting method of operation of the trailer control valve, the brakes of the trailer are released as a consequence of the pressure loading. This state continues for as long as the actuating device is held in the trailer check position. Here, the park brake of the tractor vehicle which is assigned to the trailer vehicle remains engaged. As soon as the trailer check position is left, the controller switches the trailer check valve into its original switching position again. As a result, the control connector of the trailer control valve is ventilated, and the brakes of the trailer vehicle are reset into the actuating state before the activation of the trailer check position. The controller ignores possible actuation of the actuating device into the trailer check position in the case of a moving vehicle.

DE 103 36 611 A1 describes a parking brake system of a vehicle, in the case of which parking brake system an actuating lever which can be operated by way of a driver is arranged such that it can be pivoted manually. The actuating lever has a latching position, in which a parking brake function is activated. By way of further pivoting of the actuating lever beyond the latching position, the actuating lever can be actuated into a trailer check position and, as a result, a trailer check function can be activated. A release of the actuating lever from said trailer check position brings about resetting of the actuating lever into the latching position as a consequence of a restoring spring force.

Moreover, parking brake systems are already in development, the controller of which parking brake systems comprises an automatic parking brake function. Said function brings about an automatic application of the park brake if a park operation is detected and if a controller receives a signal in this regard. A function of this type can assist the driver of a commercial vehicle and can facilitate his/her daily work. In the case of a vehicle combination which is operated with an automatic parking brake function, the necessity is eliminated that the driver actuates the handbrake or park brake in an active manner. As a result, it can occur that the driver forgets the actuation of the trailer check function and, accordingly, the vehicle combination is possibly secured insufficiently.

SUMMARY

In an embodiment, the present invention provides a method for operating an electropneumatic parking brake system of a vehicle combination. The vehicle combination includes a tractor vehicle and a trailer vehicle. The method includes activating, after a parking operation and braking of the vehicle combination, a trailer check function in a standstill state. The trailer check function enables a check as to whether, in the case of a decrease in the braking action of the trailer vehicle, the vehicle combination can be held in a stationary manner solely by way of the braking action of a parking brake of the tractor vehicle. The trailer check function is carried out automatically when a vehicle combination has been braked in a stationary manner independently by way of an automatic parking function.

BRIEF DESCRIPTION OF THE DRAWINGS

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

The FIGURE shows a flow diagram for illustrating an automatic activation of a trailer check function in accordance with an embodiment of the invention.

DETAILED DESCRIPTION

The present disclosure describes methods for operating an electropneumatic parking brake system of a vehicle combination with a trailer check function, which methods increase the operating comfort of the vehicle combination and at the same time ensure a high operating safety.

In the case of a vehicle combination which can be operated by way of an automatic parking brake function, the obligatory trailer check function can still be activated by way of the driver by way of a manual operation. This can impair, however, the comfort of an automatic parking brake function of this type, which comfort is high per se, and can even lead to operating errors. Operating errors of this type can be avoided reliably by way of an expansion of an existing automatic control of the parking brake system.

Therefore, the present disclosure provides methods for operating an electropneumatic parking brake system of a vehicle combination which consists of a tractor vehicle and a trailer vehicle. In such methods, after a parking operation and the braking of the vehicle combination in the standstill state, a trailer check function is to be activated which enables a check as to whether, in the case of a decrease in the braking action of the trailer vehicle, the vehicle combination can be held in a stationary manner solely by way of the braking action of a parking brake of the tractor vehicle.

Embodiments of the invention provide that the trailer check function is carried out automatically when a vehicle combination has been braked in a stationary manner independently by way of an automatic parking function.

The operation of the vehicle is simplified by virtue of the fact that the trailer check function is activated automatically. The driver is relieved during his/her work as a result of the omission of a working step for switching the trailer check function on and off. This is advantageous, in particular, if the vehicle combination is equipped in any case with an automatic parking function which brakes the vehicle combination at a standstill in a park position. The driver therefore cannot be in danger of forgetting the necessary trailer brake check after parking of the vehicle combination.

Should it emerge during the trailer check function which is preferably carried out automatically immediately after the automated actuation of the parking brake that the vehicle combination moves or begins to roll in the case of released trailer brakes, the driver has the possibility of intervening and securing the vehicle combination against unintentional rolling away. After the brake test, the trailer check function is deactivated automatically and the trailer brakes are applied again, with the result that the complete vehicle combination carries out braking. The automatic trailer check function can be implemented as a software function in an existing electronic controller of an electropneumatic parking brake system. An additional outlay on hardware is not required.

It can be provided in accordance with one embodiment of the invention that the automatic parking function detects a parking operation of the vehicle combination and subsequently brakes the vehicle combination in a stationary manner when an ignition system of a drive engine of the tractor vehicle is switched off at a standstill of the vehicle and this is signaled to a controller of the parking brake system, and that the trailer check function is activated automatically immediately after this, and is deactivated again automatically after the check operation. This ensures that the trailer check function is not carried out unintentionally in operating situations of the vehicle combination which are not provided for this purpose.

Moreover, it can be provided that the automatic activation and deactivation of the trailer check function can be suppressed and the trailer check function can be actuated manually if the automatic parking function is likewise suppressed and the parking function can be actuated manually, insofar as the vehicle combination has an actuating device with an operating element for a manual actuation of the parking brake system and for a manual actuation of the trailer check function.

As a result, the driver is given the possibility of actuating the trailer check function manually in particular operating situations if the automatic activation or deactivation thereof is not currently desired or is not possible. For example, the automatic function might be switched off by way of the actuation of an operating element and might be switched on again by way of renewed actuation of the operating element. It can thus be desired, for example, to brake the vehicle combination at a standstill and to carry out the trailer check function although the ignition system is not switched off or is not to be switched off. The driver might also extend the time of the brake check in case of doubt. Secondly, a brake check of the trailer vehicle might also deliberately be dispensed with in certain situations, for example if merely a brief stop is provided anyway and the driver does not leave the vehicle in the process.

Moreover, it can be provided that the automatic activation and deactivation of the trailer check function is indicated visually, acoustically and/or haptically to the driver. To this end, for example, an indicator light can be arranged at a suitable location in the dashboard of the driver's cab. As a result, the driver is informed at all times as to whether the trailer check function has been carried out or has not been carried out by way of the automatic control, and whether the vehicle combination, for the parking at a standstill of which in an operationally reliable manner he/she is responsible, is secured according to regulations.

The present disclosure also provides electropneumatic parking brake systems of a vehicle combination, such as a tractor unit with a semitrailer or a truck with a goods trailer, which electropneumatic parking brake systems are configured in such a way to operate one or more of the above descried methods.

The sole FIGURE shows a flow diagram for illustrating an automatic activation of a trailer check function in accordance with an embodiment of the invention.

In accordance with the prior art up to now, a trailer check function of a vehicle combination which consists of a tractor vehicle and a trailer vehicle, having an electropneumatic parking brake system, is activated manually by way of the driver after the engagement of the parking brake. As in EP 2 379 386 B1 which was mentioned at the outset, for example, this can take place by means of a rocker switch which is tilted by the driver out of a spring-loaded neutral position into a defined switching position, or, as in EP 1 997 700 B1 which was mentioned at the outset, by the driver rotating a spring-loaded rotary switch into a defined switching position in terms of its angular position, or, as in DE 103 36 611 A1 which was mentioned at the outset, by virtue of the fact that the driver pivots a spring-loaded actuating lever into a defined switching position.

In said switching state, the parking brake of the trailer vehicle is released for the duration of the actuation of the operating element, as long as the driver does not release the operating element again and the latter has not returned again into a neutral position. It can therefore be determined whether the parking brake of the tractor vehicle is capable of holding the entire vehicle combination including the unbraked trailer vehicle in a braked state at a standstill. This is required, in particular, when the vehicle combination is to be parked for a relatively long time and the braking action is achieved in the case of ventilated brake cylinders on the trailer vehicle. If said brake cylinders are ventilated after a relatively long time as a result of a pressure loss, the braking action of the trailer vehicle is therefore canceled, with the result that the vehicle combination has to be held solely by means of the braking action of the parking brake of the tractor vehicle. The test release which is necessary for the check and the reapplication of the trailer parking brakes after the check take place by means of an electronic controller via an electropneumatic system which actuates the relevant brake cylinders via valves and actuating members in a known way, for example as described in the abovementioned documents.

If the vehicle combination is then equipped with an automatic parking function, as a result of which the parking brake is engaged automatically during parking of the vehicle combination and after the ignition is switched off, the driver would actually still have to subsequently activate the trailer control function manually, in order to check whether the parking brake of the tractor vehicle is capable of holding the entire vehicle combination including the unbraked trailer vehicle in a braked state at a standstill.

In accordance with the invention, in contrast to this, the driver then no longer has to actuate an operating element manually if the parking brake has already been engaged automatically. As is apparent from the flow diagram according to the single FIGURE, the activation of the trailer check function then takes place automatically in accordance with the invention.

Accordingly, the method starts in a first method step S1 in the case of a detected park operation, as long as the electropneumatic parking brake system of the vehicle combination has an automatic parking function and the latter is activated. After the parking and the switching off of the ignition of the engine, the vehicle combination is automatically braked at a standstill or subjected to a parking brake operation in a second method step S2. Subsequently, the trailer check function is activated automatically in a third method step S3. Here, an electronic controller temporarily triggers the parking brake of the trailer vehicle. It can therefore be determined whether the parking brake of the tractor vehicle is capable of holding the entire vehicle combination including the unbraked trailer vehicle in a braked state at a standstill. In a fourth method step S4, the parking brake of the trailer vehicle is engaged again, and the trailer check function is deactivated automatically. The method ends in a fifth method step S5.

The five method steps S1-S5 can be part of an overall control sequence of the electropneumatic parking brake system of the vehicle combination. If it is determined that the vehicle combination is secured merely insufficiently solely by way of the parking brake of the tractor vehicle, the driver can initiate or carry out additional measures for securing the vehicle combination against rolling away.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating an electropneumatic parking brake system of a vehicle combination, the vehicle combination including a tractor vehicle and a trailer vehicle, the method comprising:
   activating an automatic parking function of the vehicle combination,
   detecting parking operation and a switching off of an ignition system of a drive engine of the tractor vehicle at a standstill of the vehicle combination,
   automatically activating, by the automatic parking function in response to the detection of the parking operation and the switching off of the ignition system, a trailer check function to check whether, in case of a decrease in braking action of a parking brake of the trailer vehicle, the vehicle combination can be held in a stationary manner solely by way of braking action of a parking brake of the tractor vehicle,
   automatically deactivating the trailer check function after determining whether the vehicle combination can be held in a stationary manner solely by way of the braking action of the parking brake of the tractor vehicle, and
   indicating to the driver, visually, acoustically and/or haptically, the automatic activation and deactivation of the trailer check function.

2. The method as claimed in claim 1, wherein the automatic activation and deactivation of the trailer check function is designed to be suppressed and the trailer check function is designed to be actuated manually if the automatic parking function is suppressed and the parking function configured to be actuated manually, wherein the vehicle combination has an actuating device with an operating element for a manual actuation of the parking brake system and for a manual actuation of the trailer check function.

3. The method as claimed in claim 1, wherein the automatic activation and deactivation of the trailer check function is indicated haptically to the driver.

4. An electropneumatic parking brake system of a vehicle combination, which electropneumatic parking brake system is configured to carry out the method as claimed in claim 1.

5. The method as claimed in claim 1, wherein automatically activating the trailer check function comprises temporarily releasing the parking brake of the trailer vehicle while the parking brake of the tractor vehicle remains engaged.

6. The method as claimed in claim 5, wherein automatically deactivating the trailer check function comprises automatically re-engaging the parking brake of the trailer vehicle.

7. A method for operating an electropneumatic parking brake system of a vehicle combination, the vehicle combination including a tractor vehicle and a trailer vehicle, the method comprising:
  applying, by an automatic parking function, parking brakes of the vehicle combination in response to a controller of the parking brake system receiving a signal indicating that an ignition system of a drive engine of the tractor vehicle is switched off at a standstill of the vehicle;
  automatically activating, in response to the applying the parking brakes of the vehicle combination, a trailer check function that enables a check as to whether the vehicle combination can be held in a stationary manner solely by braking action of a parking brake of the tractor vehicle; and
  automatically deactivating the trailer check function after the check as to whether the vehicle combination can be held in a stationary manner solely by the braking action of the parking brake of the tractor vehicle has been carried out.

8. The method as claimed in claim 7, wherein the applying, by the automatic parking function, parking brakes of the vehicle combination in response to a controller of the parking brake system receiving the signal includes activating the parking brake of the tractor vehicle and a parking brake of the trailer vehicle.

9. The method as claimed in claim 8, wherein automatically activating the trailer check function comprises temporarily releasing the parking brake of the trailer vehicle while the parking brake of the tractor vehicle remains engaged.

10. The method as claimed in claim 9, wherein automatically deactivating the trailer check function comprises automatically re-engaging the parking brake of the trailer vehicle.

11. The method as claimed in claim 10, further comprising:
  indicating, to a driver of the vehicle, the automatically activating the trailer check function; and
  indicating, to the driver of the vehicle, the automatically deactivating the trailer check function.

12. The method as claimed in claim 11, wherein the indicating, to the driver of the vehicle, the automatically activating and deactivating the trailer check function is performed via a visual, acoustic, and/or haptic signal.

13. The method as claimed in claim 11, further comprising:
  actuating the parking brakes of the vehicle combination in response to receiving, via an operating element for a manual actuation of the parking brakes of the vehicle combination, a manual actuation signal; and
  actuating the trailer check function in response to receiving, via an operating element for a manual actuation of the trailer check function, a second manual actuation signal.

* * * * *